US009108567B2

(12) United States Patent
Foltin

(10) Patent No.: US 9,108,567 B2
(45) Date of Patent: Aug. 18, 2015

(54) METHOD AND CONTROL UNIT FOR ADJUSTING A LUMINOSITY OF AT LEAST ONE HEADLIGHT OF A VEHICLE

(75) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/240,716

(22) PCT Filed: Jul. 2, 2012

(86) PCT No.: PCT/EP2012/062797
§ 371 (c)(1),
(2), (4) Date: Jul. 29, 2014

(87) PCT Pub. No.: WO2013/026601
PCT Pub. Date: Feb. 28, 2013

(65) Prior Publication Data
US 2014/0333201 A1   Nov. 13, 2014

(30) Foreign Application Priority Data
Aug. 23, 2011   (DE) .................. 10 2011 081 432

(51) Int. Cl.
*B60Q 7/00*   (2006.01)
*B60Q 1/14*   (2006.01)
*B60Q 1/32*   (2006.01)

(52) U.S. Cl.
CPC .............. *B60Q 1/1423* (2013.01); *B60Q 1/143* (2013.01); *B60Q 1/32* (2013.01); *B60Q 2300/314* (2013.01); *B60Q 2300/41* (2013.01); *B60Q 2300/42* (2013.01); *B60Q 2400/30* (2013.01)

(58) Field of Classification Search
CPC ....................................................... H05B 37/02
USPC ................................................ 315/76–80, 82
See application file for complete search history.

(56) References Cited

U.S. PATENT DOCUMENTS

2004/0032676 A1* 2/2004 Drummond et al. .......... 359/877
2010/0271195 A1  10/2010 Biondo et al.
2011/0043623 A1*  2/2011 Fukuta et al. ................. 348/135

FOREIGN PATENT DOCUMENTS

| CH | 701327 | 12/2010 |
|----|--------|---------|
| DE | 1455956 | 1/1969 |
| DE | 19902015 | 7/2000 |
| DE | 10208826 | 9/2003 |
| DE | 10254806 | 6/2004 |
| DE | 69820682 | 12/2004 |
| DE | 102004033705 | 2/2006 |

(Continued)

OTHER PUBLICATIONS

International Search Report for PCT/EP2012/062797, issued on Sep. 27, 2012.

*Primary Examiner* — Minh D A
(74) *Attorney, Agent, or Firm* — Kenyon & Kenyon LLP

(57) ABSTRACT

A method for adjusting a luminosity of at least one headlight of a vehicle is described. The method includes a step of ascertaining an illumination intensity, the illumination intensity representing light that is incident at the vehicle. Furthermore, the method includes a step of determining a setpoint value for the luminosity while using the illumination intensity, the setpoint value being adjusted if the illumination intensity rises. The method also includes a step of providing a control signal for setting the luminosity of the at least one headlight while using the setpoint value.

14 Claims, 2 Drawing Sheets

(56) References Cited

FOREIGN PATENT DOCUMENTS

| | | |
|---|---|---|
| DE | 102005021041 | 11/2006 |
| DE | 102008043854 | 5/2010 |
| DE | 102009005571 | 7/2010 |
| DE | 102009024352 | 12/2010 |
| DE | 102010006636 | 8/2011 |
| EP | 0985578 | 3/2000 |
| EP | 1950089 | 7/2008 |
| GB | 2337578 | 11/1999 |
| WO | WO 00/17009 | 3/2000 |
| WO | WO2004060716 | 7/2004 |
| WO | WO2010083802 | 7/2010 |

* cited by examiner

METHOD AND CONTROL UNIT FOR ADJUSTING A LUMINOSITY OF AT LEAST ONE HEADLIGHT OF A VEHICLE

FIELD OF THE INVENTION

The present invention relates to a method for adjusting a luminosity of at least one headlight of a vehicle, to a control unit for adjusting a luminosity of at least one headlight of a vehicle, and to a corresponding computer program product.

BACKGROUND INFORMATION

In the dark, the driver of a passenger car is able to assign a corner marking light of an oncoming truck to the truck only with difficulty, if the main headlights of the truck are masked for the driver. Because of this, the driver of the passenger car is unwittingly able to dazzle the driver of the truck if he does not dim the main headlights of his vehicle.

German Patent No. 102 54 806 shows a method for information processing of at least two information sources in a motor vehicle.

SUMMARY

Against this background, the present invention introduces a method for adjusting a luminosity of at least one headlight of a vehicle, also a control device for adjusting a luminosity of at least one headlight of a vehicle, and finally a corresponding computer program product.

The present invention is based on the realization that a corner marking light of a vehicle is recognized better if the brightness of the corner marking light is raised above a brightness that is prevailing at the location of the corner marking light. This yields a brightness contrast that enables an unequivocal observation.

The light coming in from the headlights of a third-party vehicle may advantageously be included in the brightness prevailing at the location of the corner marking light. This makes it possible to set the corner marking light to brighter if there is much light from the headlights incident at the vehicle, as, for instance, when the headlight of the oncoming third-party vehicle is being operated in a high beam mode. Because of this, one's own vehicle is able to be perceived better, and the driver of the third-party vehicle is urged to terminate the high beam mode.

The present invention creates a method for adjusting a luminosity of at least one headlight of a vehicle, the method including the following steps:

Ascertaining an illumination intensity, the illumination intensity at the vehicle representing an intensity of incident light;

Determining a setpoint value for the luminosity of the at least one headlight, while using the illumination intensity, the setpoint value for the luminosity being adjusted when the illumination intensity is increasing; and Providing a control signal for setting the luminosity of the at least one headlight using the setpoint value.

By luminosity one may understand a brightness of the at least one headlight. A headlight may be a corner marking light, an auxiliary headlight or a main headlight of the vehicle. The illumination intensity is able to represent an incident flow of light per area. Incident light may include an ambient brightness. The incident light may also include direct light incident from an headlight of a third-party vehicle. The illumination intensity may be ascertained in a region of the vehicle in which the at least one headlight is situated. In particular, the illumination intensity may be ascertained at the height of the at least one headlight. The control signal may be emitted to an interface to the at least one headlight, in order to set the luminosity of the at least one headlight correspondingly to the threshold value. Alternatively, in the step of determining, the luminosity may be lowered if the illumination intensity increases.

In the step of determining, the luminosity may be increased if the illumination intensity increases. An increase in the luminosity may be carried out to increase the visibility of the vehicle. Alternatively, the luminosity may be lowered if the illumination intensity increases. A reduction in the luminosity may be carried out when another vehicle is detected. In this case, the light quantity which enters the camera is higher than without the vehicle. In this instance, the brightness of the headlight is reduced, so as not to dazzle. That is, if there is a vehicle in the region in front of one's own vehicle, light from its headlights enters the camera and correspondingly increases the measured light flow. Now, if it is intended to carry out a by-pass light signal, by which the other driver is not to be dazzled, the brightness has to be reduced, that is, an increase in the light flow physically effects a reduction in the headlight brightness. Consequently, to express it generally, a setpoint value of the luminosity is able to change with incident light.

The at least one headlight may be a corner marking light of the vehicle. Accordingly, the control signal may be developed to set the luminosity of the at least one corner marking light. For example, corner marking lights may be used as upper limiting light of the vehicle. With that, the corner marking lights are able to be detected first by other road users. Consequently, by adjusting the luminosity of at least one corner marking light, the visibility of the vehicle with respect to other vehicle users may be increased.

The incident light may represent an ambient brightness in the surroundings of the vehicle. Provided the luminosity of the at least one headlight is set as a function of the ambient brightness, a general improvement in the visibility may be achieved, even in daylight.

The incident light from a third-party vehicle may likewise represent emitted light. Provided the luminosity of the at least one headlight is set as a function of incident light from a third-party vehicle, a driver of the third-party vehicle may be actively made aware of the presence of the vehicle, so that the driver of the third-party vehicle then changes, for example, from a high beam mode to a dimmed light mode.

The setpoint value may be adjusted if the illumination intensity drops off. One may thereby avoid too great a contrast between the headlight and the surroundings, and the dazzling of other traffic users may be prevented. The setpoint value may alternatively be increased if the illumination intensity drops off. This is relevant for the case in which the illumination intensity was lowered previously because of an oncoming vehicle.

The setpoint value may also be determined by using a distance of a third-party vehicle from the vehicle. For example, the setpoint value may be set to a greater value at equal illumination intensity if the third-party vehicle is farther away, and to a smaller value if the third-party vehicle is located closer to one's own vehicle, since the perceivable brightness of the headlight decreases with increasing distance. Because of that, the vehicle may be detected from a great distance.

Moreover, the setpoint value may be determined while taking into account a light scenario at the third-party vehicle. For this purpose, in a step of distinction, a first light scenario at the third-party vehicle may be distinguished from at least one second light scenario, and the setpoint value may further be determined while using the current light scenario. The first light scenario may be a high beam mode, for example. The second light scenario may be a dimmed light mode, for instance. The light scenario may be determined with the aid of an image evaluation and stored characteristic comparison scenarios. The setpont value may be greater if the third-party vehicle is traveling in high beam mode in order to create more attention.

The control signal may be provided if the at least one headlight is put into operation by an activation pulse of an activation signal. In this case, the activation signal may represent a signal that is able to be provided by a driver of the vehicle, for instance, by operating a lever or a switch. Consequently, the at least one headlight may be set, immediately after its activation, to a luminosity that is adjusted to the illumination intensity.

The at least one headlight may be the main headlight of the vehicle. Then, the control signal may be provided, instead of using the setpoint value, by using a standard value, if the activation pulse lasts longer than a predetermined time period. The standard value may correspond to a normal luminosity as it is set in conventional headlights. The use of the standard value may be meaningful if the driver would like to increase his range of sight, based on a danger situation, for example.

Furthermore, in a step of providing, the control signal may be provided while using a predetermined maximum value instead of using the setpoint value, if the activation pulse lasts longer than a predetermined additional time period, and/or no third-party vehicle is located within dazzling range of the at least one headlight. A maximum value is able to represent a maximum destruction-free possible brightness of the headlight. Because of an increased brightness of the at least one headlight, a region in front of the vehicle may be illuminated particularly well, in order to get a clearer view of a place of danger, for example. After the expiration of a predetermined time span, the control signal may be provided again, using the setpoint value or the standard value, in order not to overload the at least one headlight.

The present invention also creates a control unit for adjusting a luminosity of at least one headlight of a vehicle, the control unit being developed to execute the steps of a method according to one of the preceding claims. The control unit, for example, may have a device for ascertaining an illumination intensity, the intensity representing an intensity of incident light at the vehicle, a device for determining a setpoint value for the luminosity of the at least one headlight while using the illumination intensity, the setpoint value for the luminosity being adjusted when the illumination intensity increases and a device for providing a control signal for setting the luminosity of the at least one headlight while using the setpoint value.

By this design variant of the present invention, in the form of a control unit, the object on which the present invention is based may also be attained rapidly and efficiently. By a control unit one may presently understand an electrical unit which processes sensor signals and emits control signals as a function thereof. The control unit may have an interface which may be developed in terms of hardware and/or software. In a hardware-type development, the interfaces may, for instance, be a part of a so-called system ASIC which includes various functions of the control unit. However, it is also possible that the interfaces are their own integrated switching circuits or are at least partially made up of discreet components. In a software-type development, the interfaces may be software modules which are present, for example, on a microcontroller, besides other software modules.

A computer program product having program code is also of advantage, which may be stored on a machine-readable carrier such as a semiconductor memory, a hard disk memory or an optical memory, which is used for carrying out the method according to one of the specific embodiments described above, when the program is executed on a computer or a device.

DETAILED DESCRIPTION

Figure 1:
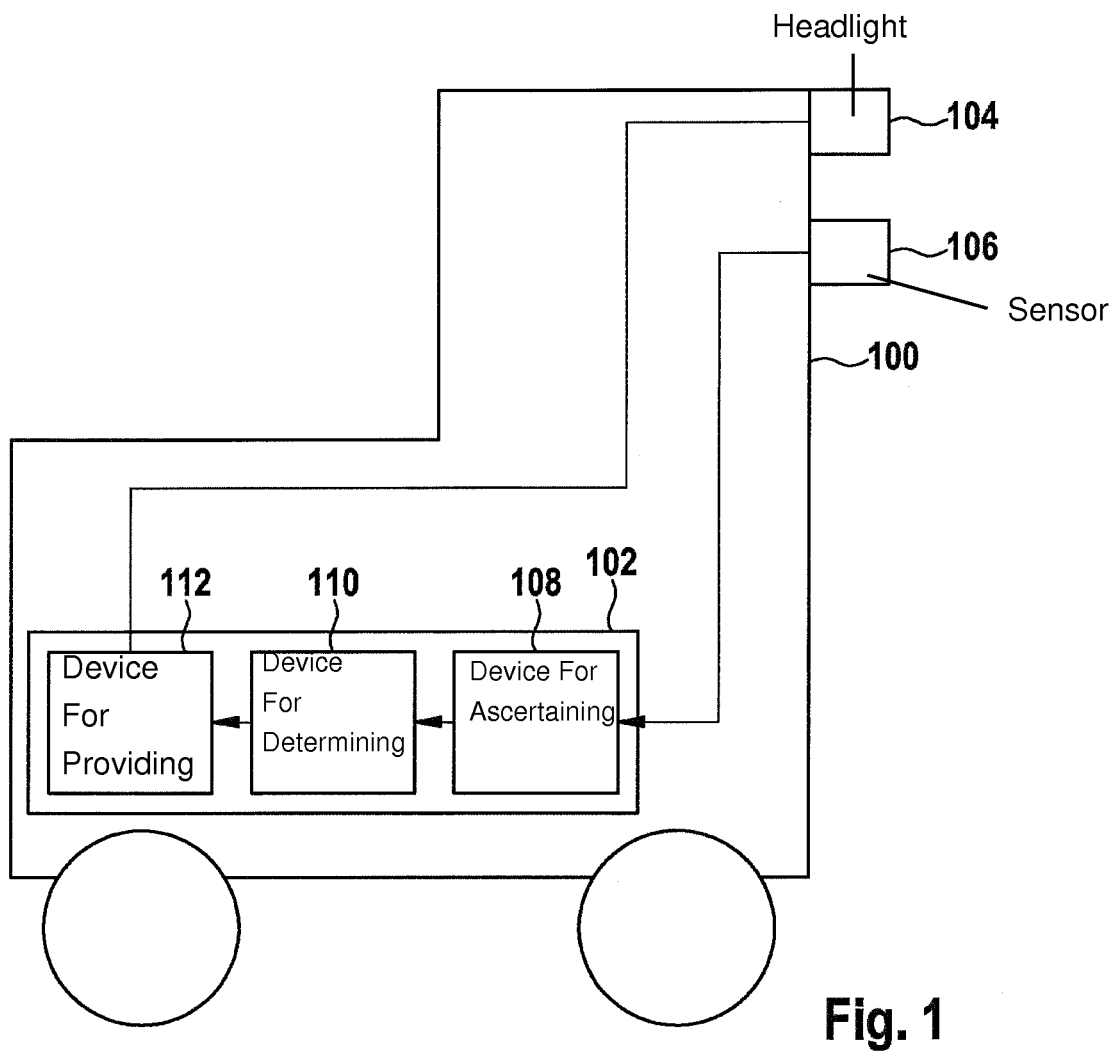
FIG. 1 a representation of a vehicle having a control unit for adjusting a luminosity of at least one headlight of a vehicle according to an exemplary embodiment of the present invention.

In the following description of preferred exemplary embodiments of the present invention, the same or similar reference numerals are used for the elements shown in the various figures, and acting in a similar manner, the repeated description of these elements being omitted.

FIG. 1 shows a representation of a vehicle 100 having a control unit 102 for adjusting a luminosity of at least one headlight 104 of vehicle 100, according to an exemplary embodiment of the present invention.

Control unit 102 is developed to receive data from a light-sensitive sensor 106, such as a camera. Control unit 102 has a device for ascertaining 108, a device for determining 110 and a device for providing 112. The device for ascertaining 108 is developed to ascertain an illumination intensity based on the data from light-sensitive sensor 106, which represent incident light in sensor 106. The device for determining 110 is developed to determine a setpoint value for the luminosity of headlight 104 while using the illumination intensity. In this context, the setpoint value increases when the illumination intensity increases. According to an alternative exemplary embodiment, as in the dazzle-free by-pass light signal, the setpoint value may also be lowered when the illumination intensity rises. The device for determining 110 may be developed to ascertain the setpont value by a comparison of a currently ascertained illumination intensity to an illumination intensity that was ascertained before in time, or one or more stored comparison values.

The device for providing 112 is developed to provide a control signal for setting the luminosity of the at least one headlight 104 while using the setpoint value. The control signal is developed to set the luminosity of the at least one headlight 104.

Sensor 106 is situated on vehicle 100, in the area of the at least one headlight 104. In this exemplary embodiment, headlight 104 is a corner marking light 104 that is situated high on vehicle 100. Vehicle 100 is a tall vehicle, such as a truck. Vehicle 100 may also be a tall trailer, for example. Since main headlights 100 are not allowed to exceed a maximum admissible height above the road, vehicle 100 has corner marking lights 104, which are supposed to make the outlines of vehicle 100 recognizable to other traffic users, when the other traffic users are not able to recognize the main headlights.

When a third-party vehicle is approaching vehicle 100, and the main headlights of vehicle 100 are masked, in the view of the driver of the third-party vehicle, it may happen that the driver of the third-party vehicle continues to operate his headlights in a high beam mode, in spite of oncoming vehicle 100. The driver of vehicle 100 may be dazzled by this. In this case, a greater light quantity is incident at sensor 106 than as if the headlights of the third-party vehicle were being operated in the low beam light mode. That is, the effect of the headlights of the third-party vehicle is that the device for ascertaining 108 ascertains an increased illumination intensity. Based on the increased illumination intensity, the device for determining 110 determines a greater setpoint value for the luminosity of corner marking lights 104. Based on the greater setpoint value, the device for providing 112 provides a control signal for corner marking lights 104 which is developed to operate corner marking lights 104 with a greater luminosity. Based on the greater luminosity of corner marking lights 104, vehicle 100 becomes easier to recognize. The driver of the third-party vehicle is able to detect vehicle 100 and to change from the high beam mode to the low beam mode. Thereupon, the dazzling of the driver of vehicle 100 diminishes or vanishes altogether. Corresponding to this, the device for ascertaining 108 ascertains a lower illumination intensity. Based on the lower illumination intensity, device for determining 110 determines a lower setpoint value for the luminosity of corner marking lights 104. Based on the lower setpoint value, device for providing 112 provides a control signal for corner marking lights 104, which is developed to operate corner marking lights 104 at a lower luminosity. In this way, in turn, the dazzling of the driver of the oncoming third-party vehicle is avoided.

Figure 2:
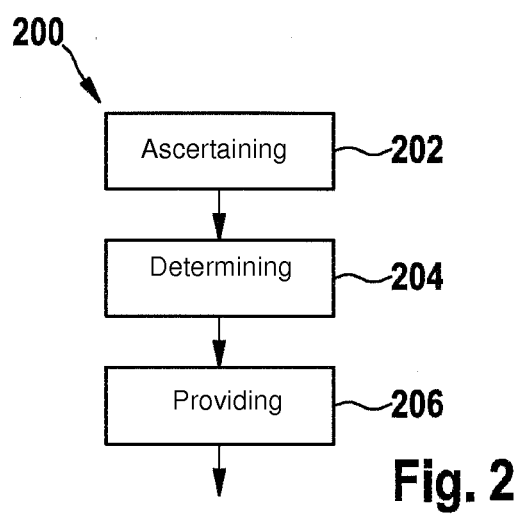
FIG. 2 a flow chart of a method for adjusting a luminosity of at least one headlight of a vehicle according to a specific embodiment of the present invention.

FIG. 2 shows a flow chart of a method 200 for adjusting a luminosity of at least one headlight of a vehicle according to an exemplary embodiment of the present invention. Method 200 may be executed on a control unit as is shown in FIG. 1. Method 200 has a step of ascertaining 202, a step of determining 204 as well as a step for providing 206. In the step of ascertaining 202, an illumination intensity is ascertained which represents incident light at the vehicle. In the step of determining 204, while using the illumination intensity, a setpoint value is determined for the luminosity of the at least one headlight, the setpoint value being changed if the illumination increases. In the step of providing 206, a control signal is provided while using the setpoint value. The control signal is developed to set the luminosity of at least one headlight or of another light source of the vehicle.

Figure 3:
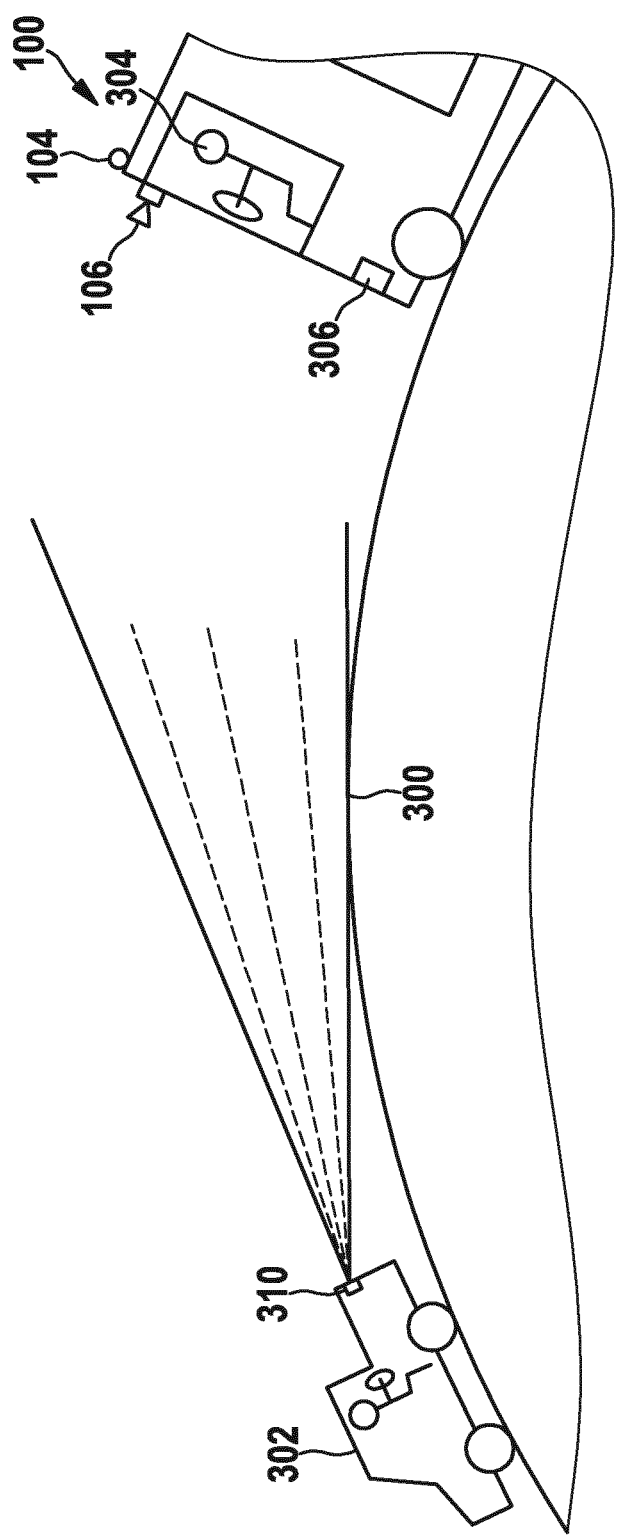
FIG. 3 a representation of a traffic situation of a vehicle having corner marking lights, which are actuated according to an exemplary embodiment of the present invention.

FIG. 3 shows a dazzling situation of a truck 100 on a rounded hilltop. The truck 100 has corner marking lights 104, a camera 106 and a control unit for adjusting a luminosity of the corner marking lights 104, according to an exemplary embodiment of the present invention. The control unit may be executed correspondingly to the control unit described with the aid of FIG. 1.

The brightness of corner marking lights 104 of truck 100 is controlled with the aid of camera 106, so that truck 100 is detected early. If truck 100 is detected early, for instance, on rounded hilltop 300 shown, by a driver of an oncoming passenger car, the driver of passenger car 302 is able to dim his lights in time. In truck 100, driver 304 is clearly sitting above headlights 306 of truck 100. This is why corner marking lights 104 are mounted on truck 100, so that truck 100 is detected in time even when there is a geometrical masking of headlights 306, for instance on rounded hilltop 300, provided corner marking lights 104 are shining brightly enough.

On the left side of FIG. 3 one may see passenger car 302, whose headlight 310 is being operated at high beam. Because of rounded hilltop 300, headlights 306 of truck 100 are not visible to the driver of passenger car 302. The driver of passenger car 302 is only able to see corner marking lights 104 of truck 100. If corner marking lights 104 are too weak, they are not perceived by the driver of passenger car 302, and passenger car 302 remains in high beam mode, which leads to the dazzling of driver 304 of truck 100.

Because of the dazzling problem, a constant improvement, "upgrading" of the (passenger car) headlights, with ever higher light flows, leads simultaneously to an "upgrading" of the passenger car illumination. For example, trucks are already being illuminated similarly brightly to parade float vehicles or equipped with blue lights in the driver's cab, for example. These may both lead to the irritation of other road users.

Since accidents involving trucks usually have severe consequences, ever more safety functions are being integrated into these vehicles. A lane departure warning may be integrated, for example, which warns of leaving the lane via a camera that recognizes the road markings. Systems such as Forward Collision Warning Systems (FCW) may be implemented via radar cameras, but also via video cameras. High beam assistants are becoming ever more successful in the truck segment. For detection, a camera image is binarized. For this purpose, brightness values in the image are distinguished with the aid of threshold values. Light sources that shine more weakly than the threshold value, that is, that are too weak, are frequently not detected or are classified as a reflector, for example.

According to one exemplary embodiment, a light-sensitive element 106 of truck 100, for instance, camera 106, detects the (potential) dazzling of truck driver 304 and adjusts the brightness of corner marking lights 104 based on the dazzling. Because of the adjustment of the brightness of corner marking lights 104, truck 100 is able to be detected in time, and the light distribution of oncoming vehicle 302 is able to be adjusted, for instance, by the driver of oncoming vehicle 302 dimming his lights. Thereby a light-technological "upgrading" may be avoided having continuously stronger truck illumination 306 which contributes exclusively to the signal image, such as daytime running lamps, but not to an increase in the range of vision. Because of the adjustment of the brightness of corner marking lights 104, truck 100 is always able to be detected in time, and the irritation of other road users 302 may be avoided.

According to one exemplary embodiment, the camera or light-sensitive element 106 in truck 100 is mounted approximately at the height of driver's head 304 or in the vicinity of corner marking lights 104. Light-sensitive element 106 recognizes the brightness arriving at the driver's eye. The brightness, in this context, is composed of the brightness of the surroundings and perhaps dazzling light. The greater the brightness, the brighter corner marking lights 104 are set. Light-sensitive element 106 is protected, for example, from a direct incidence of light from corner marking lights 104, since, because of the positive feedback, instead of the negative feedback, as usually happens in automatic control engineering, corner marking lights 104 would otherwise be set ever brighter. Consequently, in the daytime, good visibility exists (daytime running lamps (DRL)). At night, the dazzling of other road users 302 is prevented by corner marking lights 104, since, because of the low environmental light, corner marking light 104 are not set so bright.

If vehicle 302 is traveling towards truck 100 in high beam mode, the brightness at the driver's eye goes up and corner marking lights 104 are set brighter. Oncoming driver 302, who, because of rounded hilltop 300, is not able to see headlights 306 of the truck, then has the possibility of seeing corner marking lights 104 and of dimming his headlights 310.

If light-sensitive element 106 is a camera, the presence of other road users, their position and/or their number are additionally able to be evaluated, in order to avoid spurious actuations.

Similarly, using camera 106, a "high beam detection unit" may be implemented which detects whether another vehicle 302 is located in the high beam mode or the dimmed mode. If the other vehicle 302 is located in the dimmed mode, the brightness of corner marking lights 104 is not increased, or hardly so, in order not to dazzle or irritate the other driver 302.

Headlights 306 of truck 100 may also be controlled corresponding to the control of corner marking lights 104. In this context, however, in the control of headlights 306, the potential dazzling effect by headlights 306 may be taken into account in setting the brightness of headlights 306. For instance, headlights 306 may be dimmed based on approaching vehicle 302.

According to one exemplary embodiment, the approach presented here may be used both for trucks and for passenger cars, motorcycles and other motor vehicles, for instance in the case of daytime running lamps. For instance, a driver of a vehicle may draw attention to himself, via the light signal system, when vehicles are oncoming with the brights on. This is able to take place by continuously increasing the brightness of the headlights or a kind of by-pass light signal.

Corner marking lights on a trailer, such as a recreational trailer, may also be controlled by a tractor vehicle or by an independent control unit, corresponding to the incident light.

High beam is required in order to illuminate wide regions at night. The admissible light flow, that is allowed to be emitted from headlight 306 at high beam is clearly greater than that at low beam. Because of that, even far distant sources of danger may be detected. The high beam is often used as a "by-pass light signal" to warn other road users 302. At daytime, the bright high beam contributes to the visibility of the by-pass light signal, but at night, the by-pass light signal leads to dazzling. The dazzled other road user 302 does notice the warning, to be sure, but he is dazzled for a short time.

The brightness of high beam may be adjusted in motor vehicles, such as trucks or passenger cars 100, for instance, dimmed when other vehicles 302 are located in the image of camera 106. Trucks 100 have a very powerful high beam 306, which leads to great dazzling in response to putting on the brights as a by-passing light signal. If high beam 306 is to be used exclusively for signaling, a lesser luminosity is sufficient. The desire to signal may be ascertained via the presence of other road users 302 and additionally or alternatively via the surroundings brightness. Accordingly, a high beam intensity may be adjusted as a function of an object detection, by which road users 302 located in the effective range of the headlights, for example, are able to be detected.

A so-called "danger light" may automatically shine a light at objects, in order to steer the attention of driver 304 to the danger. However, object detection is not able to cover all possible cases, and because of that the driver has to continue to monitor the road space attentively. Depending on the distance, position and contrast of the object, such as a deer, the driver may wish for more light than is possible by high beam.

A sensor system looking ahead, which includes camera 106, for example, detects other road users 302 and is able to estimate their distance away, possibly by an additional sensor. If another road user 302 is located in front of vehicle 100, and the driver 304 actuates the headlight dimmer lever, the intensity of the high beam light is adjusted to the extent that the other driver 302 is able to notice the warning (by-pass light signal), but is not dazzled, or only to a certain degree. Put more accurately, each light source leads to a certain "dazzling". A by-pass light signal as a warning function is effective only by a certain degree of dazzling. The brightness of the lower beam may be maintained.

The luminosity decreases as the square of the distance. If the distance to the other road user 302 is estimated/measured, perhaps by a further sensor system, the luminosity may be adjusted more accurately.

In supplement, if the headlight dimmer lever is activated for longer than a certain time, one is able to assume that driver 304 does not intend to carry out a by-pass light signal, but has to increase his visibility range, possibly because of a detected/supposed danger (e.g. game animals). The limitation of the luminosity is removed and a luminosity is provided, as in normal high beam mode.

If there is no road user around, and driver 304 activates the high beam in a similar fashion to a by-pass light signal, the light flow may also be increased over the normal light flow, in order to light up the area in front of the vehicle even more brightly, and thus to make potential sources of danger more visible. Since the increased light flow is able to damage headlight 306, it may be brought back to normal after a specified time.

The system may also be combined with a normal (adaptive) high beam assistant, driver 304 being able to override the system durably or temporarily for the purpose of putting on the brights, for instance, as a by-pass light signal. If driver 304 uses a high beam assistant, and the latter is set to a high beam-like distribution, while driver 304 operates the headlight dimmer lever, the increased light flow is immediately able to be radiated. The activation of both functions is able to take place as a function of the activation time of the high beam function. Thus, there exists a distinction between a by-pass light signal and putting on the brights.

In a "dazzle-free by-pass light signal", headlight 306 may be dimmed in the presence of other road users. In the case of a "danger high beam", the luminosity may be increased if no other road user is present.

The exemplary embodiments described and shown in the figures have been selected merely as examples. Different exemplary embodiments are combinable with one another, either completely or with regard to individual features. An exemplary embodiment may also be supplemented by features from another exemplary embodiment. The exemplary embodiments described in connection with a truck may be used correspondingly with other vehicles, in particular, also for passenger cars. Furthermore, method steps according to the present invention may be carried out repeatedly and also performed in a sequence other than the one described.

What is claimed is:

1. A method for adjusting a luminosity of at least one headlight of a vehicle, the method comprising:
   ascertaining an illumination intensity, the illumination intensity representing an intensity of an incident light at the vehicle;
   determining a setpoint value for the luminosity of the at least one headlight, while using the illumination intensity, the setpoint value for the luminosity being adjusted when the illumination intensity is increasing; and
   providing a control signal for setting the luminosity of the at least one headlight using the setpoint value.

2. The method as recited in claim 1, wherein in the step of determining, the luminosity is increased if the illumination intensity increases.

3. The method as recited in claim 1, wherein in the step of determining, the luminosity is lowered if the illumination intensity increases.

4. The method as recited in claim 1, wherein the at least one headlight is a corner marking light of the vehicle, and wherein in the step of providing, the control signal is developed to set the luminosity of the at least one corner marking light.

5. The method as recited in claim 1, wherein in the state of ascertaining, the incident light represents an ambient brightness in surroundings of the vehicle.

6. The method as recited in claim 1, wherein in the step of ascertaining, the incident light represents light emitted by a third-party vehicle.

7. The method as recited in claim 1, wherein in the step of determining, the setpoint value is adjusted when the illumination intensity drops off.

8. The method as recited in claim 1, wherein in the step of determining, the setpoint value is determined further while using a distance of a third-party vehicle from the vehicle.

9. The method as recited in claim 1, wherein in the step of determining, the setpoint value is determined further while taking into account a light scenario at the third-party vehicle.

10. The method as recited in claim 1, wherein in the step of providing, the control signal is continuously made available after the at least one headlight has been put in operation by an activation pulse of an activation signal, the activation signal representing a signal that is able to be provided by a driver of the vehicle.

11. The method as recited in claim 10, wherein in the step of providing, the control signal is provided instead of the use of the setpoint value while using a standard value, if the activation pulse lasts longer than a specified time period.

12. The method as recited in claim 10, wherein in the step of providing, the control signal is provided instead of the use of the setpoint value while using a predetermined maximum value, if at least one of (1) the activation pulse lasts longer than a specified additional time period, and (2) no third-party vehicle is located in a dazzling range of the at least one headlight.

13. A control unit for adjusting a luminosity of at least one headlight of a vehicle, comprising:
- an arrangement for ascertaining an illumination intensity, the illumination intensity representing an intensity of an incident light at the vehicle;
- an arrangement for determining a setpoint value for the luminosity of the at least one headlight, while using the illumination intensity, the setpoint value for the luminosity being adjusted when the illumination intensity is increasing; and
- an arrangement for providing a control signal for setting the luminosity of the at least one headlight using the setpoint value.

14. A computer program product having program code for implementing, if the program code is run on a device, a method for adjusting a luminosity of at least one headlight of a vehicle, the method comprising:
- ascertaining an illumination intensity, the illumination intensity representing an intensity of an incident light at the vehicle;
- determining a setpoint value for the luminosity of the at least one headlight, while using the illumination intensity, the setpoint value for the luminosity being adjusted when the illumination intensity is increasing; and
- providing a control signal for setting the luminosity of the at least one headlight using the setpoint value.

* * * * *